United States Patent [19]

Zacharias et al.

[11] 4,326,623
[45] Apr. 27, 1982

[54] METHOD AND APPARATUS FOR FEEDING, CLAMPING, AND REMOVAL OF BAR OF TUBE GOODS

[75] Inventors: Theodor Zacharias, Meerbusch; Hartmut Diel, Mönchen-Gladbach, both of Fed. Rep. of Germany

[73] Assignee: Friedrich Kocks GmbH & Company, Hilden, Fed. Rep. of Germany

[21] Appl. No.: 127,476

[22] Filed: Mar. 5, 1980

[30] Foreign Application Priority Data

Mar. 13, 1979 [DE] Fed. Rep. of Germany ....... 2909769

[51] Int. Cl.³ ............................................. B65G 29/00
[52] U.S. Cl. .................................. 198/345; 198/608; 198/722
[58] Field of Search ................ 198/345, 459, 491–492, 198/608, 634, 717, 722, 723, 772, 777; 414/745, 748, 750; 193/35 A, 40; 221/270, 290, 298

[56] References Cited

U.S. PATENT DOCUMENTS 2,679,748  6/1954  Kent et al. ...................... 198/345 X

FOREIGN PATENT DOCUMENTS 2002360  7/1977  Fed. Rep. of Germany ...... 198/608

Primary Examiner—Robert B. Reeves
Assistant Examiner—Douglas D. Watts
Attorney, Agent, or Firm—Buell, Blenko, Ziesenheim & Beck

[57] ABSTRACT

An apparatus and method is provided for feeding, clamping and removing bar or tube goods in tube test presses which have a bearing surface consisting of several supporting crossbeams spaced parallel to each other, and at least two disk-like driven rotors having at least one hook-like peripheral projection spaced on at least one axis of rotation, where each axis of rotation runs crosswise to the crossbeams under their bearing surfaces, such that only hook-like peripheral extensions of the rotors project above the bearing surfaces for transporting and clamping the goods, the improvement comprising at least one tenterhook pivotable adjacent the bearing surface between a first position below the bearing surface and a second position above the bearing surface of the crossbeam and parallel to the rotor adjacent each rotor, and which, pivoted to said second position above the bearing surface during clamping, grips the goods on side opposite the adjacent rotor involved.

9 Claims, 3 Drawing Figures

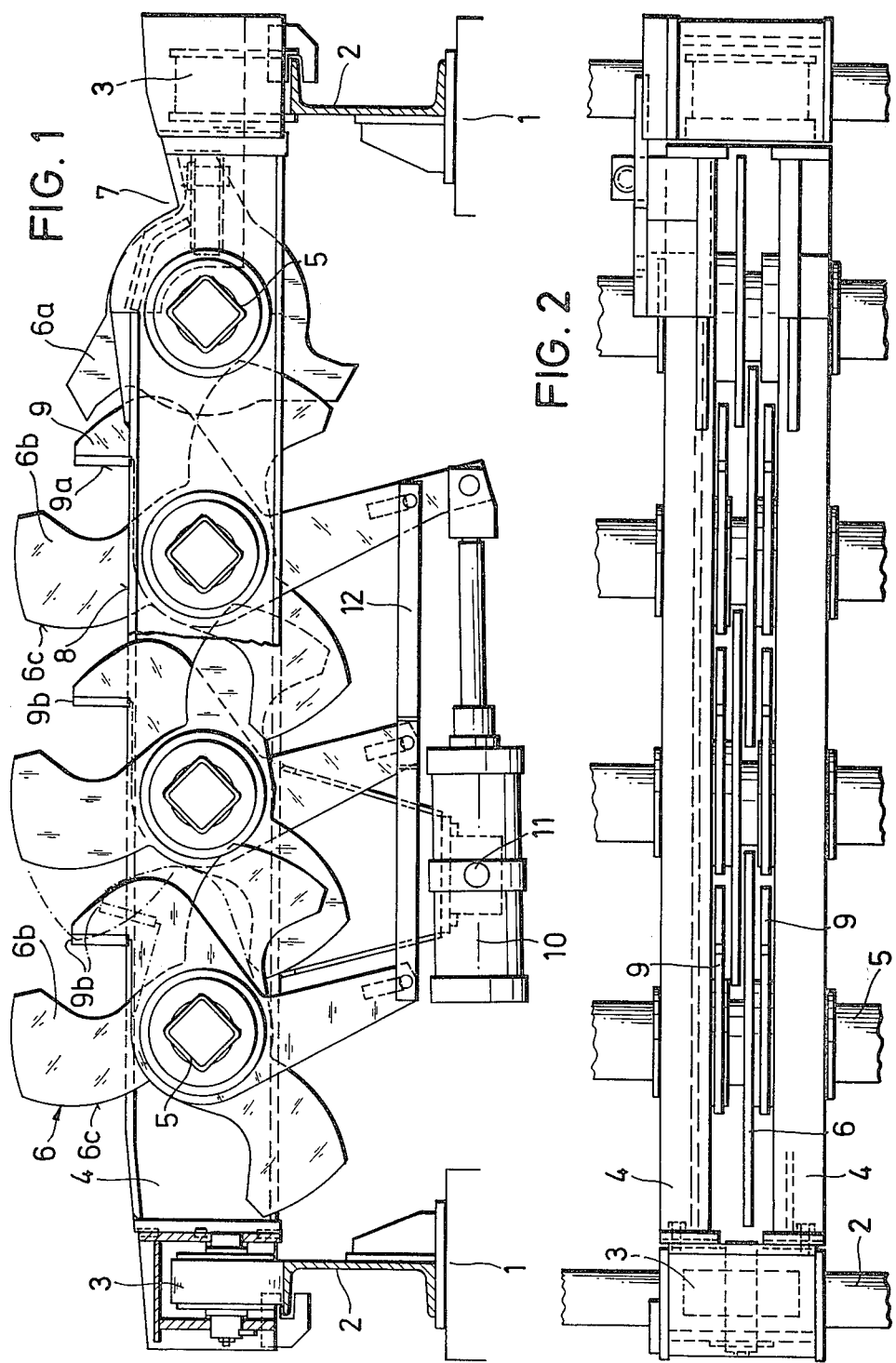

METHOD AND APPARATUS FOR FEEDING, CLAMPING, AND REMOVAL OF BAR OF TUBE GOODS

This invention relates to methods and apparatus for feeding, clamping and removal of bar and tube goods and particularly to methods and apparatus for feeding, clamping and removing tubes in tube testing presses, which have a bearing surface consisting of several crossbeams spaced parallel to each other and at least two disk-like driven rotors that are spaced along at least one rotating shaft, where each shaft runs crosswise to the crossbeams underneath their bearing surfaces, so that only the hook-like peripheral extensions of the rotors project above the bearing surfaces for transporting and holding the goods.

In a familiar arrangement of this type (DE-PS No. 20 02 360) the rotors have peripheral extensions, only one of which is hook-shaped. The nonhook-shaped peripheral extensions serve only to transport the goods, while the hook-shaped peripheral extensions are provided for holding. During the clamping, the goods are held by the hook-shaped peripheral extensions when the rotors are turned against the direction of transport. The goods are pressed against the bearing surfaces of the support surface and held fast.

This familiar arrangement, which has proven excellent at normal transport speeds, no longer functions with the operating reliability required at high transport and holding speeds. The tubes then drop with a great deal of noise onto the support surfaces, assume the wrong positions, and consequently are not always held precisely in the correct manner and at the site of the hook-shaped extension as it should be. For example, if the arrangement is used in tube testing presses, the position of the tube does not always match precisely that of the test heads, which can result in damage to both.

The purpose of the invention is to improve the familiar construction design, to be able to clamp the goods reliably at the predetermined site even at high transport and clamping speeds.

This problem is resolved according to the invention in that each rotor has at least one tenterhook, running parallel to it, which is optionally pivotable above or below the bearing surface of the crossbeams, and which, pivoted above the bearing surface during clamping, grips the goods on the side opposite the pertinent rotor.

This is achieved, first, in that the goods are always clamped at the same, precisely predetermined site because the tenterhook, together with the bearing surface of the crossbeams, forms a prism-like two-sided stop, against which the goods are pressed by the peripheral extensions of the rotors. The holding position is thus precisely defined and a clamping outside of this position is impossible. Even at high transport and clamping speeds, the material is always brought into the same position and clamped at the same site, in which case one of the peripheral extensions of the rotors presses the material solidly against the stop surface of the tenterhook. If the arrangement is used in a tube testing press, the test heads can be shoved onto the tube ends without fear of damage. The stops formed by the tenterhooks facilitate high transport speeds because the material to be held by them is reliably stopped and there is no possibility of deviation. Jumping of the tube is essentially avoided; therefore, there is little noise either. Another significant advantage is that the peripheral extensions of the rotors can all have the same shape and form and that they can be produced with considerably less manufacturing precision. It is advisable here to make all the peripheral extensions of the rotors hook-shaped in the same manner. This makes it possible to clamp the material every time and at each of the prescribed positions.

If the hook-shaped peripheral extensions of the rotors have faces that drive the goods in the direction of transport, it is also recommended that these faces have a curvature that gives the material a constant transport speed at constant r.p.m. of the rotors. A quiet uniform transport of the goods with low noise and careful handling is the advantageous result.

It is also advantageous if the gripping levers are pivotably supported on the same rotation shafts as the associated rotors, but independent from them. The tenterhooks can then be swung up above the bearing surface of the crossbeams at any desired time with a simple designing of their supports, in order to initiate the holding process, or dropped below the bearing surface, which facilitates a flawless through-passage of the goods without clamping.

In another variant of the invention, the rotors and tenterhooks form a unit in the region of one or two adjacent crossbeams with it or them, which can be moved in the longitudinal direction of the axes of rotation relative to them. Such a variant is primarily suited for arrangements on which goods of variable length must be fed, held, and removed. The rotors and tenterhooks can then be moved in the longitudinal direction of the material so that it is held at regular intervals and no long overhanging end sections result and sag under their own weight.

It is generally advisable that the upper edges of the tenterhooks advancing above the bearing surfaces when the tenterhooks are swung up remain in the direction of transport behind the face of the adjacent rotor that drives the piece of material. During the pivoting up of the tenterhooks, it is thus avoided that the material is lifted up by them, which would render the prescribed clamping impossible. If the advancing upper edge of the tenterhooks remains behind the driving face of the adjacent rotor, this face pushes the goods into the region between the tenterhooks and the associated rotors, which makes a lifting impossible and guarantees a reliable clamping.

It is also recommended to drive the rotors in the direction of transport by at least one electric motor and against the direction of transport by means of compressed air. This has the advantage that the numerous rotations of the rotors during transport actuates the economically operating electric drive, while the compressed air drive always assures a reliable clamping with a predeterminable gripping force, independently of the tolerance of the cross sectional dimensions of the material and independently of the manufacturing imprecision of the peripheral extensions of the rotors. Although the rotors rotate synchronously during transport, during clamping the rotors of the different axes of rotation can move independently of each other over the entire clamping range. In arrangements with several axes of rotation, a transfer of the clamping force from unoccupied clamping sites to others can also be advantageously avoided.

With such a drive, it is expedient if the electric motor or motors continue to run without load uncoupled from at least one clutch during clamping and the rotors are then driven with a limited angle of rotation by compressed air turning cylinders. The electric motor or motors then do not need to be continuously started, stopped, and reversed in direction of rotation with the rapidly succeeding working cycles, which is uneconomical. When the rotors are turned against the direction of transport during clamping, they need to traverse only a small angle of rotation. Consequently, they do not require compressed air motors with a high r.p.m. and a high air consumption; rather, the compressed air turning cylinders mentioned above are sufficient. The compressed air turning cylinders can then be installed directly on the rotating shafts and turn with the shafts during transport of the goods, while they are supported during clamping over the braked drive shafts assigned to them. This results in a simple space-saving construction of high operating reliability.

According to another feature of the invention, the first rotors in the direction of transport serve only to take up and transport the material and their electric motor-driven rotary movement in the direction of transport is briefly delayed at the moment of taking up the material by an oppositeacting compressed air turning cylinder. The first rotors in the direction of transport have an identical or the same drive as the other rotors, except that the compressed air acts on the turning cylinders of the first rotors only if their hook-like peripheral extensions are just ready to catch a new piece of material. If the rotary movement in the direction of transport is delayed at this moment, the piece of material is not abruptly lifted, but raised gently, which spares both the material and the equipment and results in less noise. What was described above with air as the pressure medium can also be carried out with a liquid pressure medium.

The invention is illustrated in the drawing by means of an implementation example, wherein:

FIG. 1 shows an arrangement according to the invention in front view;

FIG. 2 shows a longitudinal section of the arrangement according to FIG. 1 in plan view.

Figure 3:
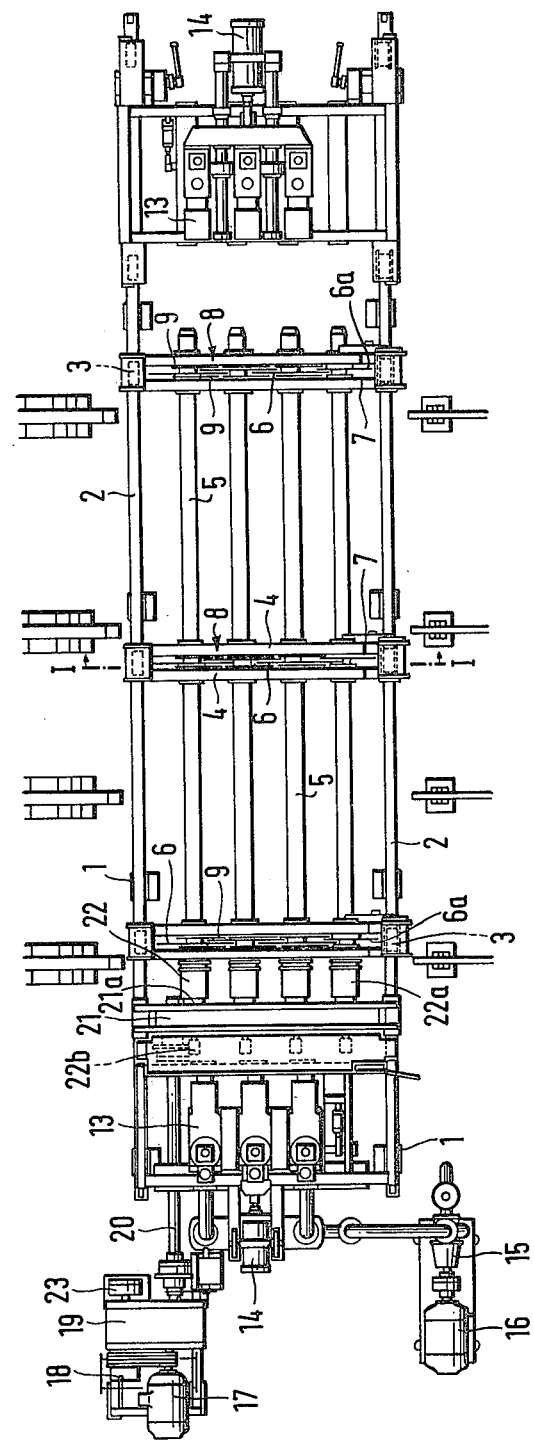
FIG. 3 shows a triple tube testing press equipped according to the invention in plan view.

Two guide rails 2 of channel iron are situated on a base 1. The chassis 3 of two crossbeams 4, only one of which can be seen in FIG. 1, runs on the guide rails 2. However, there are several at some distance from each other, which also have separate chassis 3. Rotating shafts 5 with a square cross section, on which rotors 6 are supported, are common to them. There is a total of four rotating shafts 5 between the guide rails 2 in the example shown in FIG. 1, but this number can be varied widely at will. The rotary shaft 5 to the far right in FIG. 1 has a disk-like rotor 6a, which serves only to take up the material from the chute 7.

With the aid of the rotor 6a, the material comes onto the crossbeam or crossbeams 4, i.e., onto their bearing surfaces 8. At this point in time, the tenterhook (designated by 9) is not in the position shown, but underneath the bearing surface 8, such that the material in FIG. 1 can be conveyed to the left. This conveyance is effected by the hook-like peripheral extensions of the rotors 6, which run here in a counterclockwise direction. The material is moved forward by the convex curved face of the hook-like peripheral extensions 6b. This movement of the material can continue as long as desired without any clamping.

In order to clamp or hold the material, a working cylinder 10 is actuated; it is fastened in a hinged bearing 11 underneath the crossbeam 4, pivotable on it. If a pressure medium is fed to the working cylinder 10, it swings all the tenterhooks 9 by means of a rod 12 into the position shown in FIG. 1. If the rotors 6 are then driven in the opposite direction of rotation, i.e., clockwise, they press the material against the stop faces (designated by 9a) of the tenterhooks 9, with the concave curved second face of the hook-like peripheral extensions 6b. When the processing or testing is completed and the material is to be conveyed on to the left, all that is required is to change the direction of rotation of the rotors 6 and the tenterhooks 9 swing back down to their resting position underneath the bearing surface 8 through an appropriate actuation of the working cylinder 10.

An intermediate position of a tenterhook 9 and an adjacent rotor 6 is indicated with dashed lines in FIG. 1 between the last and next-to-last rotating shaft 5. It can be clearly seen that the advancing upper edge 9b remains behind the face 6c of the adjacent rotor 6, which drives the piece of material (not shown).

It can be seen in FIG. 2 that two adjacent crossbeams 4 have a common chassis 3 and that the rotors 6 and the tenterhooks 9 are located between the two crossbeams 4. Care should be taken here that only one rotor 6, but two tenterhooks 9 are supported on each shaft 5, but this is not absolutely necessary. While the rotors 6 are fastened on the shafts 5 so that they cannot rotate freely and are moved over them by a drive (not shown), the tenterhooks 9 are installed loose on the shafts 5.

FIG. 3 shows an application example of the arrangement according to the invention, in a triple tube testing press. This press has two sets of three testing heads 13 lying alongside each other, between which three tubes (not shown) are placed and held fast in a coaxial position to the testing heads 13 with the aid of the arrangement according to the invention. The components of the arrangement are designated with the same reference numbers as in FIGS. 1 and 2.

If the tubes are clamped in their test position, the testing heads 13 are shifted axially so that the tube ends extend into the testing heads and are then sealed outward. The axial displacement of the testing heads 13 is effected by the working cylinder 14. The tubes to be tested are then filled with the test medium, usually water, by means of a pump 15 than is driven by a motor 16 and subjected to the test pressure. Finally, the tubes are released from the pressure of the test medium and the testing heads 13 withdrawn, the working cylinder 14 being appropriately actuated and the test medium flowing out. The tested tubes are then moved ahead in their original direction of transport and the next tubes are simultaneously brought into the test position. The delivery, clamping, and removal of the tubes take place with the invention arrangement in this testing process.

Besides the structural components of the arrangement already described, the drive of the shafts 5 and thus the disk-like rotors 6 and/or 6a can be seen in FIG. 3. The drive is effected by a motor 17, which drives a gear unit 19 through a clutch 18 which can be engaged and disengaged. A drive shaft 20 transfers the drive power to a distributor gear 21, by which the individual shafts 5 are driven. The latter takes place through the drive shafts 21a of the distributor gear unit 21 and through the compressed air turning cylinder 22, which transfer the torque from the distributor gear unit 21 directly to the shafts 5, in which case the compressed air turning cylinders 22 and 22a rotate also. The rotors 6 and/or 6a are also turned in the direction of transport, such that the material in FIG. 3 is conveyed upward.

If three tubes are to be tested and they are within the range of the test heads 13, the rotors 6 and/or 6a are stopped suddenly by disengaging the motor 17 with the aid of the clutch 18 and most likely a brake 23 is simultaneously switched on. The motor 17 can then continue to run undisturbed, while the gear unit 19, the shaft 20, the distributor gear unit 21, its drive shafts 21a, the turning cylinders 22, the shafts 5, and thus the rotors 6 and/or 6a stop and assume the position indicated at one point in FIG. 1 by dashed lines. By actuating the working cylinder 10, the tenterhooks 9 are swung into the clamping position shown in FIG. 1 with continuous lines. Finally, the compressed air turning cylinders 22 that carry the rotors 6, i.e., only those located between the test heads 13 for clamping and transport, are actuated through the air supply heads 22b in the appropriate direction with compressed air. When subjected to compressed air in the appropriate direction, the compressed air turning cylinders 22 turn the rotors 6 against the direction of transport and thus clamp the tubes fast, in which case the tenterhooks 9 with their stop faces 9a and the bearing surfaces 8 serve as the tube supports. The components 19–21a of the drive held by the brake 23 act here as the torque support for the compressed air turning cylinders 22.

When the test process is completed, the compressed air turning cylinders 22 are loaded with compressed air in the opposite direction, the clamping action of the rotors 6 is thus released, the tenterhooks 9 are swung into the rest position, and the motor 17 can again drive the shafts 5 and thus the rotors 6 and/or 6a if the brake 23 is released and the clutch 18 engaged.

The rotors 6a are driven through a compressed air turning cylinder 22a, but not in the prescribed manner. The compressed air turning cylinder 22a, through which the rotors 6a are driven, is not simultaneously loaded with compressed air as the turning cylinder 22, but only when the peripheral extensions of the rotors 6a are just ready to pick a tube out of the chute 7. A loading of the turning cylinder 22a with compressed air then, because it is acting against the direction of transport, induces a brief delay in the rotational movement of the rotors 6a, so that they grip the tube with the appropriate slowness at first, but then increasingly rapidly until the normal transport speed is reached, and deposit it on the bearing surface 8.

In the foregoing specification certain preferred practices and embodiments of this invention have been set out, however, it will be understood that this invention may be otherwise embodied within the scope of the following claims.

We claim:

1. In apparatus for feeding, clamping, and removing of bar or tube goods, especially tubes, in tube test presses, which apparatus have a bearing surface consisting of several supporting crossbeams spaced parallel to each other, and at least two disk-like driven rotors having at least one hook-like peripheral projection spaced on at least one axis of rotation, where each axis of rotation runs crosswise to the crossbeams under their bearing surfaces, such that only hook-like peripheral extensions of the rotors project above the bearing surfaces for transporting and clamping the goods, the improvement comprising at least one tenterhook pivotable adjacent the bearing surface between a first position below the bearing surface and a second position above the bearing surface of the crossbeam and parallel to the rotor adjacent each rotor, and which tenterhook when pivoted to the said second position above the bearing surface during clamping, grips the goods on side opposite the adjacent hook-like projection of the rotor involved, between said hook-like projection and the tenterhook and means reversing said rotor to clamp the goods against the tenterhook.

2. Arrangement according to claim 1, characterized in that all the peripheral projections of the rotors are identically hook-shaped.

3. In apparatus for feeding, clamping, and removing of bar or tube goods, especially tubes, in tube test presses which have a bearing surface consisting of several supporting crossbeams spaced parallel to each other, and at least two disk-like driven rotors having at least one hook-like peripheral projection spaced on at least one axis of rotation, where each axis of rotation runs crosswise to the crossbeams under their bearing surfaces, such that only hook-like peripheral extensions of the rotors project above the bearing surfaces for transporting and clamping the goods, the improvement comprising at least one tenterhook pivotable adjacent the bearing surface between a first position below the bearing surface and a second position above the bearing surface of the crossbeam and parallel to the rotor adjacent each rotor, and which, pivoted to said second position above the bearing surface during clamping, grips the goods on side opposite the adjacent rotor involved, all of the peripheral projections of the rotors being hook-shaped and being characterized in that the hook-like peripheral extensions of the rotors have faces that drive the goods in the direction of transport, the curvatures of which endow the goods with a constant transport speed at a constant rotor r.p.m.

4. In apparatus for feeding, clamping, and removing of bar or tube goods, especially tubes, in tube test presses which have a bearing surface consisting of several supporting crossbeams spaced parallel to each other, and at least two disk-like driven rotors having at least one hook-like peripheral projection spaced on at least one axis of rotation, where each axis of rotation runs crosswise to the crossbeams under their bearing surfaces, such that only hook-like peripheral extensions of the rotors project above the bearing surfaces for transporting and clamping the goods, the improvement comprising at least one tenterhook pivotable adjacent the bearing surface between a first position below the bearing surface and a second position above the bearing surface of the crossbeam and parallel to the rotor adjacent each rotor, and which, pivoted to said second position above the bearing surface during clamping, grips the goods on side opposite the adjacent rotor involved, all of the peripheral projections of the rotors being hook-shaped and being characterized in that the tenterhooks are pivotably supported on the same axis of rotation as the rotors accompanying them, but are independent of them.

5. Arrangement according to claim 1 or 2, characterized in that the upper edges of the tenterhooks that advance over the bearing surfaces when the tenterhooks are pivoted upward remain in the transport direction behind the faces of the adjacent rotors that drive the piece of goods involved.

6. In apparatus for feeding, clamping, and removing of bar or tube goods, especially tubes, in tube test presses which have a bearing surface consisting of several supporting crossbeams spaced parallel to each other, and at least two disk-like driven rotors having at least one hook-like peripheral projection spaced on at least one axis of rotation, where each axis of rotation runs crosswise to the crossbeams under their bearing surfaces, such that only hook-like peripheral extensions of the rotors project above the bearing surfaces for transporting and clamping the goods, the improvement comprising at least one tenterhook pivotable adjacent the bearing surface between a first position below the bearing surface and a second position above the bearing surface of the crossbeam and parallel to the rotor adjacent each rotor, and which, pivoted to said second position above the bearing surface during clamping, grips the goods on side opposite the adjacent rotor involved, all of the peripheral projections of the rotors being hook-shaped and being characterized in that the rotors are driven in the direction of transport by at least one electric motor and against this direction by means of compressed air.

7. Arrangement according to claim 6, characterized in that clutch means are provided wherein the at least one electric motor continues to run uncoupled without load during the gripping of at least one piece of goods or tube and compressed air turning cylinders act on the rotors whereby the rotors are then driven with a limited angle of rotation.

8. Arrangement according to claim 7, characterized in that brake means is provided for stopping the rotor shafts and the compressed air turning cylinders are installed directly on the axes of rotation and rotate with the shafts during transport of the goods, while they press against the shafts by action of their braked drive shafts during clamping.

9. Arrangement according to claim 1 or 2, characterized in that compressed air turning cylinders act on the first rotors in the direction of transport which rotors serve only to take up and transport the goods whereby their rotational movement in the direction of transport is briefly delayed at the time of taking up the goods by the opposite-acting compressed air turning cylinders.

* * * * *